UNITED STATES PATENT OFFICE.

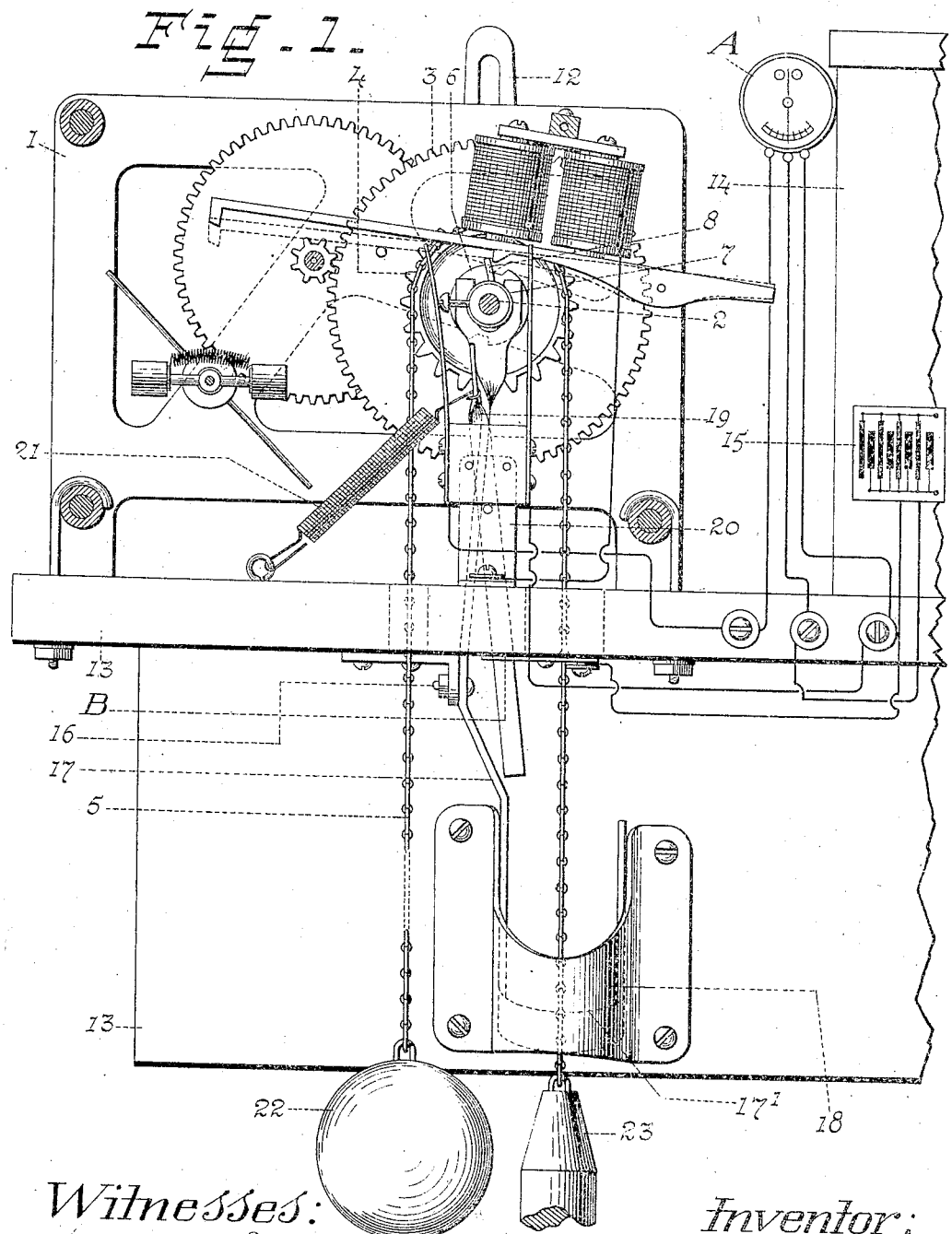

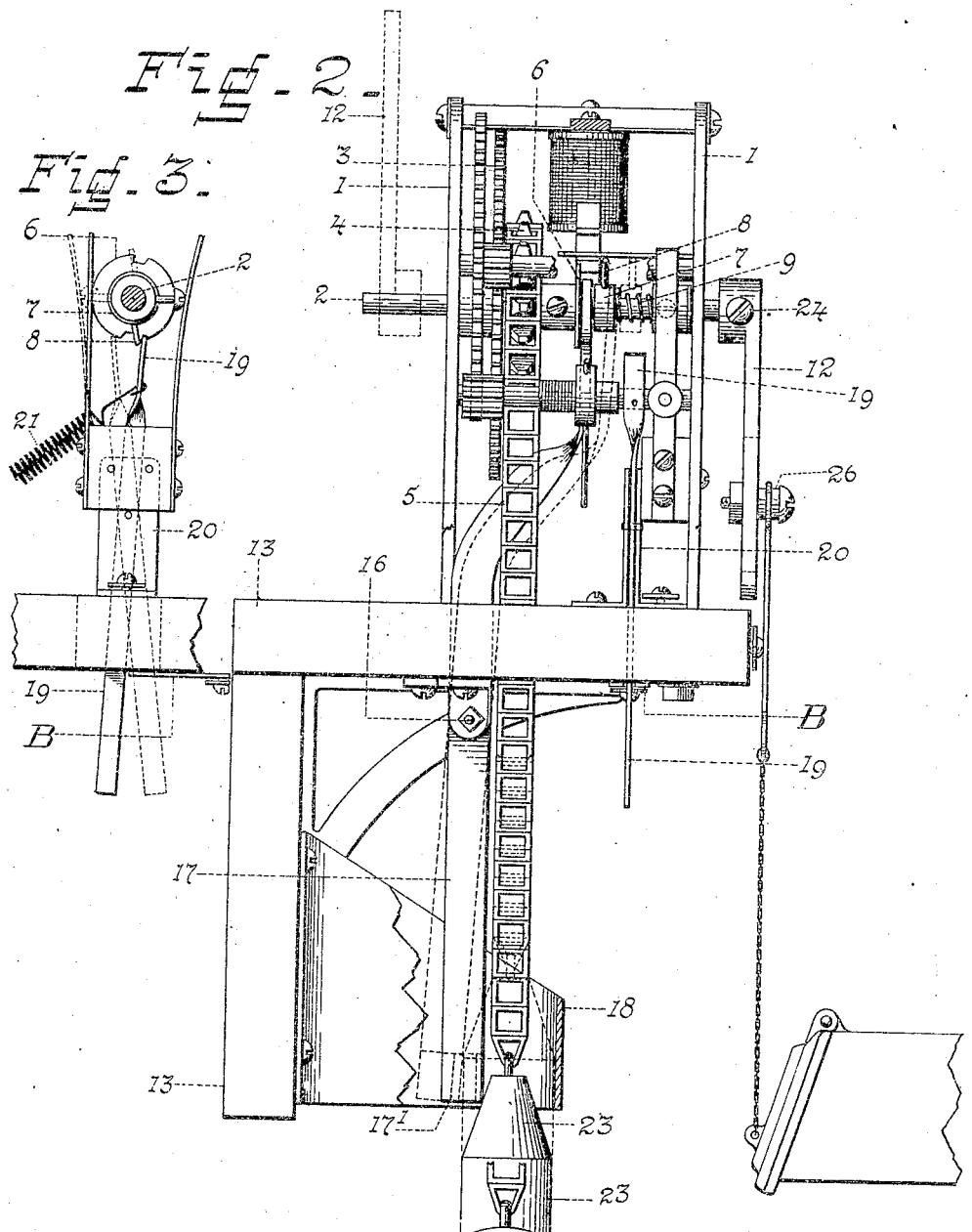

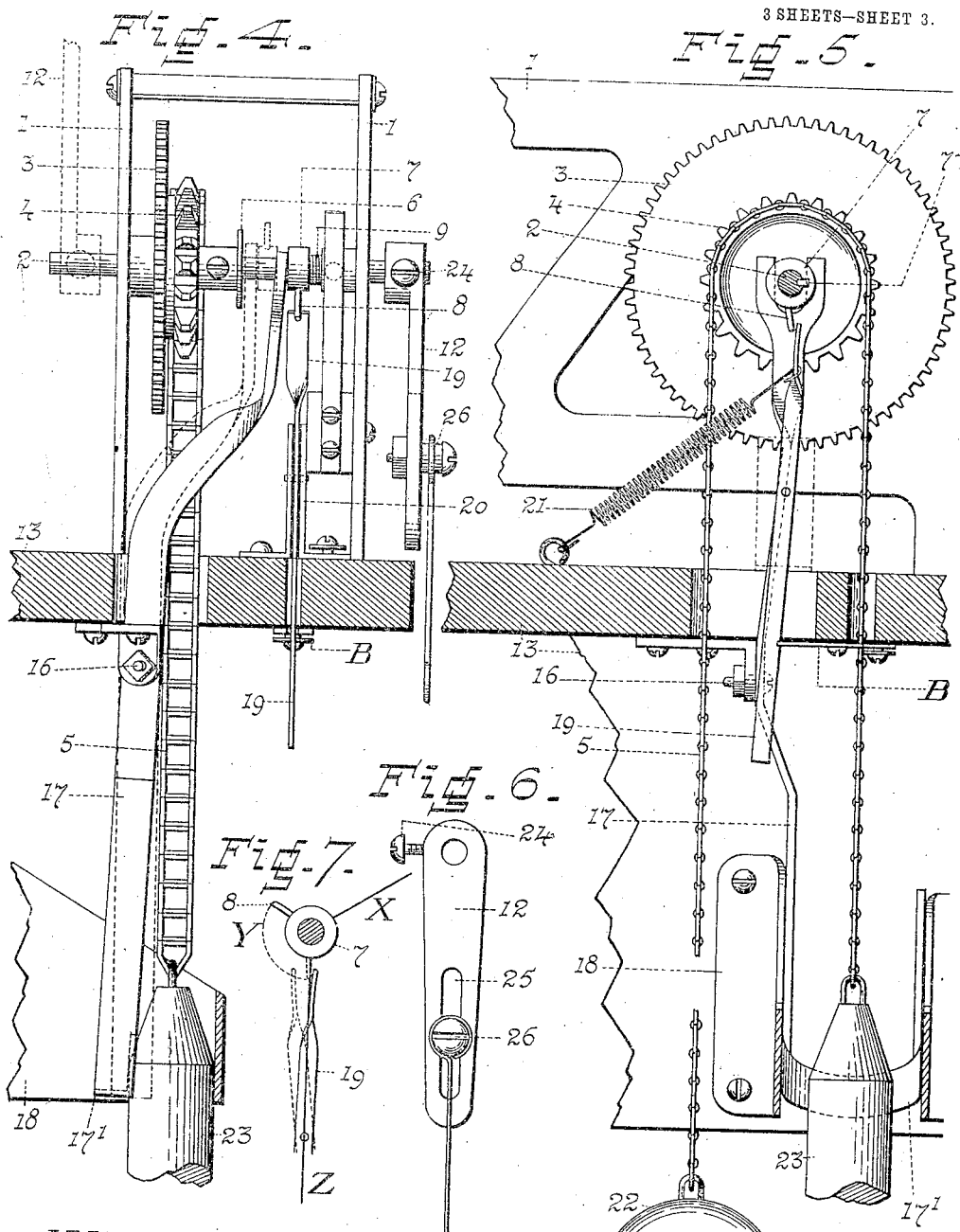

CHARLES EDGAR JEWELL, OF AUBURN, NEW YORK.

TEMPERATURE-REGULATOR MOTOR.

951,732.  Specification of Letters Patent.  Patented Mar. 8, 1910.

Application filed June 21, 1905. Serial No. 266,352.

*To all whom it may concern:*

Be it known that I, CHARLES EDGAR JEWELL, a citizen of the United States, residing at Auburn, in the county of Cayuga and State of New York, have invented a Temperature-Regulator Motor, of which the following is a specification.

My invention relates to damper regulators and consists in certain novel features hereinafter described reference being had to the accompanying drawings which illustrate one form in which I have contemplated embodying the invention, and the said invention is fully disclosed in the following description and claims. Devices of this character usually comprise an apparatus termed the "motor" actuated by a weight or spring which requires rewinding at intervals, and which is provided with rotating devices operatively connected with the dampers of a heater, and with mechanism for arresting the said rotating devices in two different positions, and a second apparatus (usually a thermostatic device) located in the chamber or room the temperature of which is to be regulated, which is suitably connected with the controlling mechanism of the "motor", so as to permit or cause an operation of the dampers in accordance with variations of the temperature of the chamber or room to be heated, for the purpose of maintaining an even and regulated temperature therein, determined by the thermostatic device. Such devices are well known in the art and it is customary to so connect the rotating devices of the motor to the draft damper of the heater that one half revolution thereof will move the damper into open position and the other half revolution will move it into closed position. In the operation of such devices, it sometimes happens that the caretaker whose duty it is to rewind or otherwise reinstate the motive power of the motor, will neglect this duty, and the last operation of the motor at the close of its operative period effects the opening of the draft damper. This leaves the heater in a dangerous condition, and may result in the burning out of the furnace, or a serious accident to the building and occupants.

The object of my present invention is to insure that the last effective operation of the "motor" before the close of its operative period, shall leave the draft damper in closed or safe position, so that no injury shall result from the carelessness of the caretaker, should he fail to rewind or otherwise reinstate the motive power of the motor. In order to accomplish this result I provide mechanism operable by the power supply near the close of its operative period for stopping the further operation of the motor in a predetermined position, to wit, with the draft damper in closed position, and this is effected in the embodiment of my invention herein shown and described by disconnecting the thermostatic controlling device from the motor at a time when the damper actuating device thereof is in the predetermined position.

In the accompanying drawings, which illustrate the embodiment of my invention before referred to, Figure 1 represents a front elevation of the motor shown supported on a shelf, the front of its frame-work being removed for a clearer view of the interior parts. Fig. 2, is an end elevation of the motor showing it connected with the dampers or doors of a heater. Fig. 3, is a view showing a lever arranged in the motor, breaking the electric circuit between the said motor and the thermostat; it also shows the toothed hub by which it is operated. Fig. 4, is an end view similar to Fig. 2, but having such parts of the motor as obstruct a view of my improvement and not intimately connected therewith, removed. Fig. 5, is a front elevation with all the parts of the motor not intimately connected with the improvement removed, that a clear conception can be had of its operation. Fig. 6, is a view of a crank-arm, removed from the main rotary member of the motor. Fig. 7, is a diagram intended to illustrate the operative relation between a crank-arm and the toothed hub.

Similar letters and figures for reference, refer to similar parts in the several views.

In the apparatus illustrated in the drawings I employ a plug, or other obstruction, of any suitable form and length having a tapered end where it is secured on the unweighted part of a chain carrying a driving weight, which said plug being pulled by said chain into a confined space against the end of a pivoted lever, causes the latter to yield and force its opposite end against a hub having a projection or tooth, pushing said hub along the rotating member of the motor into vertical alinement with another pivoted lever which is operated to break the electric circuit with a thermostat during a pre-determined one half revolution of the rotating member, at the end of which said one-half revolution, the crank-arms provided on the rotating member and connected with the dampers or doors of the heater also rest.

Referring to Fig. 1:—a detailed description of one example of construction will be given. The frame-work 1, supports a main driving, rotating member or shaft 2, which carries a main driving gear 3, connected with a train of wheels which it is unnecessary to describe. A clutched wheel 4, on which is carried a chain 5, a detented disk 6, a hub 7, having a spline-seat $7^1$, and a tooth 8, a spiral spring 9, and another hub having a projection, and the crank-arms 12, are all carried on said main rotating member 2. The detented disk 6, and the last mentioned hub having a projection having no intimate connection with the improvement, will not again be referred to. Where the hub 7, passes on the main rotating member 2, the latter is provided with a spline which passes in a spline-seat $7^1$, of the hub 7. A shelf 13, is furnished which supports the motor in desired working position. It also supports a box 14, in which is carried a storage cell or cells 15, or a battery which is suitably wired to a thermostat A.

At a convenient point as seen at 16,—Figs. 1, 2, 4, and 5,—is pivoted a lever 17, the upper end of which is forked on either side of the rotating member 2, so it may be brought to bear against one side of the hub 7. The opposite or bottom end of said pivoted lever 17, is broadly flattened and upwardly bent as seen at $17^1$, in Fig. 5, and is carried in a girth-piece 18, the ends of which are properly secured on the shelf 13. Another pivoted lever 19,—see Figs. 2, 3, 4, and 5,—is pivoted between suitable supports 20, on the shelf 13, being extended upward toward the rotating member 2, and downward through said shelf 13, as seen. It is arranged, beneath said shelf, to have contact with the connections to the thermostat as shown at B.

A drive-chain 5, passes on the clutched wheel 4, and is provided with a weight 22, the said clutched wheel being of sprocket form if desired, and so clutched or arranged as to cause the rotating member to turn toward the weighted end of the chain while it is free to turn on said rotating member in the opposite direction, a well known arrangement unnecessary to describe. The other end of said chain 5, passes through the girth-piece 18, and is provided with a plug or stop-piece 23, which is tapered at its end of attachment with the said chain, and continued in any desired length or form; it is plainly seen in Figs. 1, 4, and 5.

Crank-arms 12, are provided with a set-screw 24, which fastens them on the rotating member 2, in the position desired. They also are provided with a slot 25, in which a crank-pin 26, is adjustable, which arrangement provides for the taking up of any unnecessary slack or for lengthening the connections between them and the dampers or doors of the heater.

Referring to the drawings it will be seen that suitable openings are provided in the shelf 13, at suitable points for the passage of the chain and the pivoted levers referred to, they being sufficiently extended to permit of the unobstructed movements of the said parts.

The remaining features of the motor which are shown it is thought unnecessary to describe in detail as they are well known to those skilled in the art, and have been drawn in order that the mechanism to which the improvement is applied might be complete and coherent, and also to show there is no practical interference between the two.

Referring to Figs. 4, and 5, a clear idea of the operation of the improvement can be had. The several parts described being arranged with due relation to each other as seen, and the crank-arms arranged on the rotary member so as to operate through their connections with the dampers or doors of the heater in a predetermined manner, that is: so they may be left closed or otherwise when the motor is brought to a stop, the latter may be left with no further care or attention on the part of the operator. When the weight on the chain is nearly "run down" and its power for actuating the motor nearly exhausted, the tapered end of the plug on the opposite end of the chain will have been drawn into the confines of the girth-piece 18. The said girth-piece offers a space wide enough for the tapered end of the plug to enter unobstructed; but, as the latter is drawn up into it, the larger untapered part comes in contact with the end and sides of said girth-piece and, giving way to such influence, it is forcibly brought against the flattened end of the pivoted lever projected therein. This action causes the said pivoted lever 17, to yield and, swinging on its pivotal point, its opposite or topmost end is forced against the side of the hub 7, next to it which latter yielding, is pushed along on the rotating member against the spiral spring 9, until the tooth 8, of the said hub 7, is brought into alinement with the top end of the pivoted lever 19. As soon as the said tooth has, through the turning of the rotating member, been brought to bear against the top of said pivoted lever 19, the latter yields and the electric circuit with the thermostat A, is broken. It should be observed that the breaking of the circuit as above described does not of itself stop the motor, which will operate until it completes the half revolution through which it is then moving, the damper actuating parts being brought to rest by the stop lever forming part of the usual stop mechanism, which I have shown but have not thought it necessary to describe. In the device shown in the drawings the motor will be arrested by said stop lever immediately after the operation of the switch lever 19, and the damper actuating mechanism will be in the "draft closed" position. When the plug 23, on the chain is withdrawn from the girth piece,—which is done in the operation of "winding up",—the pressure on the lower end of the pivoted lever 17, is relaxed and the spiral spring 9, on the rotary member retracts against the hub 7, and crowds it against the forked top end of the pivoted lever 17, which now assumes its normal position as shown in positive lines in Fig. 2. During this action the tooth of the hub 7, has been released from the end of the pivoted lever 19, which through the retraction of a spiral spring 21, provided for the purpose, causes it to resume its first position as shown in Fig. 1, thus establishing the electric circuit when the motor again becomes operative.

It will be evident to those skilled in the art that other and various forms of construction can be had and the spirit of my invention remain the same.

What I claim therefore as new and desire to secure by Letters Patent of the United States of America, is:

1. In a temperature controlling apparatus, the combination with a motor provided with damper actuating mechanism, and means for controlling the stopping and starting of the damper actuating mechanism in two positions, a thermostatic device operatively connected with the said controlling means of the motor, and additional means operable by the motor near the close of its operative period, for disconnecting the thermostatic device, from the motor during a movement of the damper actuating mechanism into draft closed position, whereby said damper actuating mechanism will be arrested by its controlling mechanism in a draft closed position.

2. Thermostatic damper regulating apparatus comprising among its members actuating mechanism driven by power operative for a determinate period, means for arresting said actuating mechanism with the dampers in open draft and closed draft positions, and means operable by the power supply, near the close of its operative period for stopping the actuating mechanism with the dampers in the closed draft position, substantially as described.

3. Thermostatic damper regulating apparatus comprising among its members, damper actuating mechanism, a motor therefor, operative during a determined period, detent mechanism for arresting the actuating mechanism with the dampers in closed draft, and open draft positions, a thermostat operatively connected with and controlling said detent mechanism, and a device operated by the motor near the end of its operative period, for securing the final stopping of said actuating mechanism with the dampers in closed draft position, substantially as described.

4. Thermostatic damper regulating apparatus comprising among its members, damper actuating mechanism, a motor, means for winding the motor to cause it to operate during a determined period, detent mechanism for stopping the actuating mechanism with the dampers in closed draft and open draft positions, a thermostat normally controlling the operation of said actuating mechanism, and mechanism called into action by the running down of the motor, for insuring the final stopping of the actuating mechanism with the dampers in closed draft position, substantially as described.

5. Thermostatic damper regulating apparatus comprising among its members, damper actuating mechanism, a motor, means for winding the motor to cause it to operate during a determinate period, detent mechanism for stopping the actuating mechanism with the dampers in closed draft and open draft positions, a thermostat normally controlling the operation of said actuating mechanism, a safety mechanism actuated by a part connected with the motor, for insuring the final stopping of the actuating mechanism with the dampers in closed draft position, and means operated by the rewinding of the motor for restoring said safety mechanism to its normal condition, substantially as described.

6. In a temperature controlling apparatus, the combination with a motor provided with a crank shaft, damper actuating mechanism connected with said crank shaft, means for controlling the starting and stopping of said crank shaft at each half revolution thereof, a thermostatic device, electrical connections between said thermostatic device and the said controlling means of the motor, and additional means operable by the motor near the close of its operative period for disconnecting the thermostatic device from the motor, during the half revolution of the crank shaft, which moves the damper actuating mechanism into draft closed position.

7. In a temperature controlling apparatus, the combination with a motor provided with a crank shaft, damper actuating mechanism connected with said crank shaft, means for controlling the starting and stopping of said crank shaft at each half revolution thereof, a thermostatic device, electric connections between said thermostatic device and the said controlling means of the motor, a switch for disconnecting the thermostat from the motor, a rotary actuating part, having a predetermined fixed radial relation to the crank shaft, and lying normally out of the path of the said switch, and means operable by the motor, near the close of its operative period, for moving said actuating part into operative relation with the switch whereby said switch will be operated during a predetermined half revolution of the crank shaft.

8. In a temperature controlling apparatus the combination with a motor provided with a crank shaft, damper actuating mechanism connected with said crank shaft, means for controlling the starting and stopping of said crank shaft at each half revolution thereof, a thermostatic device, electric connections between said thermostatic device and the said controlling means of the motor, a switch for disconnecting the thermostat from the motor, a rotary actuating part, having a predetermined fixed radial relation to the crank shaft, and lying normally out of the path of the said switch, a lever for moving said actuating part into operative relation with the said switch, said motor comprising a driving sprocket wheel, a motor weight and a chain, having one end connected with said weight, and engaging said driving wheel, and a device carried by said chain adjacent to the end not connected with the weight for operatively engaging said lever, whereby the said switch will be operated during a predetermined half revolution of the crank shaft.

In testimony whereof I affix my signature, in presence of two subscribing witnesses.

CHARLES EDGAR JEWELL.

Witnesses:
FRANK R. RATHBUN,
A. H. WHEELER.